US011928074B2

(12) United States Patent
Chen et al.

(10) Patent No.: US 11,928,074 B2
(45) Date of Patent: Mar. 12, 2024

(54) USB ACTIVE OPTICAL CABLE AND PLUG CAPABLE OF MANAGING POWER CONSUMPTION AND STATUS

(71) Applicant: EverPro (Wuhan) Technologies Company Limited., Wuhan (CN)

(72) Inventors: Ting Chen, Beijing (CN); Hui Jiang, Beijing (CN); Xinliang Zhou, Beijing (CN); Dezhen Li, Beijing (CN); Yan Li, Beijing (CN); Yufeng Cheng, Beijing (CN); Liang Xu, Beijing (CN); Jinfeng Tian, Beijing (CN)

(73) Assignee: EVERPRO (WUHAN) TECHNOLOGIES COMPANY LIMITED, Wuhan (CN)

( * ) Notice: Subject to any disclaimer, the term of this patent is extended or adjusted under 35 U.S.C. 154(b) by 0 days.

(21) Appl. No.: 17/664,056

(22) Filed: May 19, 2022

(65) Prior Publication Data

US 2022/0374387 A1 Nov. 24, 2022

(30) Foreign Application Priority Data

May 21, 2021 (CN) .......................... 202110557211.5
Jan. 20, 2022 (CN) .......................... 202210066752.2

(51) Int. Cl.
*G06F 13/42* (2006.01)
*G02B 6/42* (2006.01)
(Continued)

(52) U.S. Cl.
CPC ....... *G06F 13/4282* (2013.01); *G02B 6/4246* (2013.01); *G02B 6/43* (2013.01); *G06F 13/382* (2013.01); *G06F 2213/0042* (2013.01)

(58) Field of Classification Search
CPC ...................................................... G01S 17/87
See application file for complete search history.

(56) References Cited

U.S. PATENT DOCUMENTS

2012/0011286 A1\* 1/2012 Wong ..................... H04B 10/40
710/14
2012/0141132 A1 6/2012 Walker
(Continued)

FOREIGN PATENT DOCUMENTS

CN  102621644 A  8/2012
CN  103308996 A  9/2013
(Continued)

OTHER PUBLICATIONS

Notice of Allowance in corresponding Chinese Application No. 202210066752.2, dated Mar. 16, 2022.
(Continued)

*Primary Examiner* — Henry Tsai
*Assistant Examiner* — Juanito C Borromeo
(74) *Attorney, Agent, or Firm* — Grossman, Tucker, Perreault & Pfleger, PLLC.

(57) ABSTRACT

A USB active optical cable and a plug capable of managing power consumption and state. The USB active optical cable and plug respectively comprises a first plug, a second plug, and an optical transmission medium used to connect the first plug and the second plug; the first plug and the second plug are configured to operate different operating states, including an initialization mode, a transmission mode, and a power saving mode, and they can switch between the different operating states. The USB active optical cable and plug are both based on the separate control of the transmitting unit and the receiving unit to distinguish different operating modes, provide necessary operating requirements and mode switching conditions for each mode, and also enable the checking and transmission of the plugging state in the power saving mode, thus facilitate the power consumption management of the active optical cable.

15 Claims, 3 Drawing Sheets

(51) Int. Cl.
*G02B 6/43* (2006.01)
*G06F 13/38* (2006.01)

(56) References Cited

U.S. PATENT DOCUMENTS

2012/0191997 A1* 7/2012 Miller .................. G02B 6/4284
713/323
2014/0023312 A1 1/2014 Shang et al.

FOREIGN PATENT DOCUMENTS

| CN | 104009800 A | 8/2014 |
| CN | 113094318 A | 7/2021 |
| CN | 113193914 A | 7/2021 |
| CN | 113283464 A | 8/2021 |

OTHER PUBLICATIONS

First Office Action in corresponding Chinese Application No. 202210066752.2, dated Mar. 4, 2022.

* cited by examiner

USB ACTIVE OPTICAL CABLE AND PLUG CAPABLE OF MANAGING POWER CONSUMPTION AND STATUS

CROSS REFERENCE TO RELAYED APPLICATIONS

The present application claims priority to Chinese Patent Application No. 202110557211.5 (A USB plug and active optical cable capable of managing power consumption and state) filed on May 21, 2021 and Chinese Patent Application No. 202210066752.2 (A USB active optical cable and plug capable of managing power consumption and state) filed on Jan. 20, 2022, which are incorporated herein by reference in its entirety.

TECHNICAL FIELD

The present application relates to the field of USB data transmission, and in particularly, applicable to a USB active cable capable of managing power consumption and state.

BACKGROUND INFORMATION

With the update of USB protocols and the increase of the transmission rates, pure copper wires are unable to support long-distance transmission at high rate due to their attenuation characteristic, making active cables an increasingly important transmission method.

The current active cable transmission method has proposed many solutions, comprising re-driver solutions, re-timer solutions and Optically Isolated Active Cable transmission solutions. Among these, the transmission solutions based on light transmission medium are gaining more and more attention due to the possibilities of the lighter cable and longer transmission distance.

Regardless of the transmission solution, the checking and transmission of system state, as well as power consumption management, are issues that need to be addressed.

There is no separate signal channel to transmit some state information in the USB protocols, and all state and data are transmitted through one channel. That is, the USB data channel transmits the system state, the low speed signal as well as the high speed signal. This makes it a very important question how the active transmission device of the USB transmits the system state, and how to implement power consumption management to maintain a consistent state of the plugs at both ends of a transmission apparatus and, consequently, of an entire USB system.

Power consumption management is mainly required to meet the power saving states specified in the USB protocols, in particularly the U3 state, where the power consumption of the USB transmission apparatus must not exceed the protocol requirements. By default, the principle of lower power consumption should be followed based on satisfying performance. For a hub or a re-timer transmission solution with a link layer, power consumption management is not difficult to realize, but for other USB active transmission apparatuses that conduct pure transmission without link layer command recognition/management, how to realize power consumption management requires special consideration. In particular, for the active optical cable, it is not only necessary to adjust the state of the active optical cable itself to support low power consumption, but also to able to check the state of the downstream port and the upstream port connected by plugs at both ends under a low power consumption state, while informing the state of the downstream port to the upstream port and informing the state of the upstream port to the downstream port, thus maintaining a consistency of the state of the downstream port and the upstream port. Furthermore, it is necessary to wake up the circuit of the active optical cable itself in time to transmit the wake-up signal when the system performs a wake-up operation.

The most critical aspect of system state checking and transmission is the checking and transmission of the plugging and unplugging state of the downstream port and the upstream port, that is, the checking and the transmission of the receiver termination state of the downstream port and the upstream port. In the state machine specified in the USB protocols, Rx. Detect is a state in which the port checks for the presence of a USB3. X link partner. If the port detects the low-impedance receiver termination ($R_{RX-DC}$), it is assumed that a matching upstream port/downstream port is plugged and in a connected state, then the port enters a polling stage. For copper wire transmission media, it is not difficult to achieve the checking and transmission of the receiver termination state. Since copper wire is a conductor and has the ability to transmit electrical characteristics itself, so the receiver termination state can be transmitted through copper wire. However, optical mediums are not conductors, and conventional electrical signals such as voltage, resistance and current cannot be transmitted through optical fibers; for Optically Isolated Active Cable, the power supply at both ends is completely independent, with no copper connections at all in between, so it is particularly important how the receiver termination state can be transmitted in real time.

Therefore, how to enable the checking and transmission of different system state and the management of power consumption for the USB active optical cable and the USB plug, solving difficulties such as plugging and unplugging detection and power consumption management of the USB active optical cable to realize the effective transmission of USB signal on the optical transmission medium have become the urgent technical problems to be solved by the prior art.

SUMMARY

The purpose of the present application lies in proposing a USB plug and an active optical cable capable of managing power consumption and state, wherein the operating states of the transmitting unit and the receiving unit of the active optical cable plug are divided into an initialization mode, a power saving mode and/or a transmission mode; the necessary operating requirements and mode switching conditions are provided for each mode, and the checking and transmission of the plugging and unplugging state can be carried out under the power saving mode, thus facilitating the management of the power consumption of the active optical cable and the transmission of the system state. The present application is not only suitable for Optically Isolated Active Cable and hybrid cables of various power supply modes, but also for application scenarios such as unconventional plugging and unplugging.

For this purpose, the present application adopts the technical solution as follows:

A USB active optical cable capable of managing power consumption and state, comprising:
  a first plug, a second plug and an optical transmission medium connecting the first plug and the second plug,
    wherein the first plug is used for connection to the host, comprising a first transmitting unit, a first receiving unit, and a first control unit; and the first transmitting unit comprises a first electrical input port, a first transmitting high-speed transmission circuit and a first output circuit; and the first receiving unit comprises a first electrical output port, a first receiving high-speed transmission circuit, and a first input circuit;

wherein the second plug is used for connection to the device, comprising a second transmitting unit, a second receiving unit, and a second control unit; and the second transmitting unit comprises a second electrical input port, a second transmitting high-speed transmission circuit and a second output circuit; and the second receiving unit comprises a second electrical output port, a second receiving high-speed transmission circuit, and a second input circuit; and When the first plug connects to the host, the first transmitting unit and the first receiving unit are powered on and enter an initialization mode respectively;

wherein under an initialization mode, the first receiving unit of the first receiving unit continuously detects a first optical signal the first electrical output port of the first receiving unit performs the receiver termination at an interval of t0; when a low-impedance receiver termination ($R_{RX-DC}$) is detected, the first control unit drives the first output circuit to output the first optical signal and controls the first transmitting unit to process a transmission mode; and/or when the second plug connected to the device, the second transmitting unit and the second receiving unit are powered on and process an initialization mode respectively;

wherein under an initialization mode, the second input circuit of the second receiving unit continuously detects whether the first optical signal is transmitted from the first plug, while the second electrical output port of the second receiving unit performs receiver termination detection at and interval of t0;

when a low-impedance receiver termination ($R_{RX-DC}$) is detected, the second control unit causes the second output circuit to output the first optical signal to inform the first plug that the second plug has been connected with the device, and to cause the second transmitting unit to enter a transmission mode.

Optionally, when the first receiving unit is under the initialization mode, the first input circuit receives the first optical signal to cause the first receiving unit to enter a transmission mode, while the first control unit configures the first electrical input port to the low-impedance receiver termination ($R_{RX-DC}$) and informs the state of the connection between the device and the second plug.

Optionally, when the second receiving unit is under the initialization mode, the second input circuit receives the first optical signal to cause the second receiving unit to enter a transmission mode, while the second control unit configures the second electrical input port to a low-impedance receiver termination ($R_{RX-DC}$) and informs the device of the state of the connection between the host and the first plug.

Optionally, when the first input circuit does not receive the first optical signal the first receiving unit remains in the initialization mode. The power consumption of the first receiving unit in the initialization mode is less than that of the first receiving unit in the transmission mode; and when the second input circuit does not receive the first optical signal, the second receiving unit remains in the initialization mode. The power consumption of the second receiving unit in the initialization mode is less than that of the second receiving unit in the transmission mode.

Optionally, when the first transmitting is under a transmission mode, the first plug receives the transmission data transmitted from the host, the first output circuit of the first transmitting unit emits light and transmits data to the second receiving unit of the second plug; and when the second receiving unit is under a transmission mode, the light transmitted from the first output circuit to the second receiving high-speed transmission circuit through the second input circuit. Wherein the light processing in the second receiving high-speed transmission circuit and sending to the device by the second electrical output port.

Optionally, when the second transmitting unit is under a transmission mode, the second plug receives the transmission data transmitted from the device, the second output circuit of the second transmitting unit emits light and transmits data to the first receiving unit of the first plug; and when the first receiving unit is under a transmission mode, the light transmitted from the second output circuit to the first receiving high-speed transmission circuit through the first input circuit. Wherein the light processing in the first receiving high-speed transmission circuit and sending to the device by the first electrical output port.

Optionally, when the second plug of the USB cable has not been connected to the device while the first plug is connected to the host:

the first input circuit continuously detects a first optical signal, while the first electrical input port will present high impedance to ground of ZRX-HIGH-IMP-DC-POS; and once the second plug is connected to the device, first input circuit receives the first optical signal, and the first control unit controls the first receiving unit to enter a transmission mode, while the first electrical input port is configured to the low-impedance receiver termination ($R_{RX-DC}$).

Optionally, when the first plug of the USB cable has not been connected to the host while the second plug is connected to the device, the second input circuit continuously detects a first optical signal, while the second electrical input port will present high impedance to ground of ZRX-HIGH-IMP-DC-POS; and once the first plug is connected to the host, the second input circuit receives the first optical signal, the second control unit controls the second receiving unit to enter a transmission mode, while the second electrical input port is configured as a low-impedance receiver termination ($R_{RX-DC}$).

Optionally, when the first plug or the second plug is connected to the host or device respectively, each waits t4 time and then processes the initialization mode; and/or for self-powered USB plugs, when the first plug or the second plug is powered on again after power off, each waits t4 time and then enters the initialization mode.

Optionally, the respective operating modes of the first plug and the second plug further comprise a power saving mode; and the first power output port of the first plug in the power saving mode performs receiver termination detection at an interval of t2, and if the low-impedance receiver termination ($R_{RX\text{-}DC}$) is detected, the first control unit causes the first output circuit to emit the second optical signal; and the second input circuit of the second plug in the power saving mode conducts polling at an interval of t3, and if the second optical signal is detected, the second plug remains in the power saving mode.

Optionally, the first electrical input port under the power saving mode responds to the detection of the AC signal input, the first output circuit outputs the first optical signal, while the first transmitting unit enters the transmission mode from the power saving mode; and the second input circuit under the power saving mode responds to detection of the first optical signal, while the second receiving unit enters the transmission mode from the power saving mode.

Optionally, the second electrical output port of the second plug in the power saving mode performs receiver termination detection at an interval of t2, and if the receiver termination is detected as normal, the second control unit causes the second output circuit to emit the second optical signal; and the first input circuit of the first plug in the power saving mode conducts polling at an interval of t3, and when the second optical signal is detected, the first plug remains in the power saving mode.

Optionally, t2 is a time setting of less than 100 ms (milliseconds), and t3 is configured between t2 and t2+t4 of the other plug which it is matched.

Optionally, the first electrical output port in the power saving mode conducts polling for the receiver termination detection at an interval of t2; when no receiver termination is detected on the first electrical output port, the first plug enters the initialization mode directly, and the first electrical input port is configured to a high-impedance receiver termination; or the first plug waits for t4 and then enters the initialization mode, and the first electrical input port is configured to a high-impedance receiver termination; and/or the second electric output port in the power saving mode conducts polling for the receiver termination detection at an interval of t2; when no receiver termination is detected on the second electrical output port, the second plug enters the initialization mode directly, and the second electric input port is configured to a high-impedance receiver termination; or the second plug waits for t and then enters the initialization mode, and the second electrical input port is configured to a high-impedance receiver termination.

Optionally, the first optical signal is different from the second optical signal.

The present application further discloses a USB plug for connection to a host, comprising: a first transmitting unit, a first receiving unit, and a first control unit;

wherein the first transmitting unit comprises a first electrical input port, a first transmitting high-speed transmission circuit and a first output circuit; and the first receiving unit comprises a first electrical output port, a first receiving high-speed transmission circuit, and a first input circuit; and the first transmitting unit and the first receiving unit are powered on and enter an initialization mode to respond to the USB plug being connected to the host; and under an initialization mode, the first input circuit of the first receiving unit continuously detects a first optical signal, the first electrical output port of the first receiving unit performs the receiver termination detection at an interval of t0; when a low-impedance receiver termination ($R_{RX\text{-}DC}$) is detected, the first control unit drives the first output circuit to output the first optical signal and controls the first transmitting unit to enter a transmission mode.

Optionally, when the first receiving unit is under the initialization mode, the first input circuit receives the first optical signal and causes the first receiving unit to enter a transmission mode, while the first control unit configures the first electrical input port to the low-impedance receiver termination ($R_{RX\text{-}DC}$).

Optionally, when the first transmitting unit is under the transmission mode, the USB plug receives the transmission data transmitted from the host, the first output circuit of the first transmitting unit emits light and sends data to the second receiving unit of the second plug; and/or when the first receiving unit in a transmission mode, the light transmitted from the second output circuit to the first receiving high-speed transmission circuit through the first input circuit. Wherein the light processing in the first receiving high-speed transmission circuit and sending to the device by the first electrical output port Optionally, the operating mode of the USB plug further comprises a power saving mode; and the first electrical output port of the USB plug in a power saving mode performs receiver termination detection at an interval of t2, and if the receiver termination is detected as normal, the first control unit causes the first output circuit to emit a second optical signal; and the first electrical input port under the power saving mode responds to the detection of the AC signal input, the first output circuit outputs the first optical signal, while the first transmitting unit enters a transmission mode from the power saving mode; and while the first transmitting unit enters the transmission mode, the first receiving unit also enters the transmission mode.

The present application further discloses a USB plug for connection to a device, comprising: a second transmitting unit, a second receiving unit, and a second control unit;

wherein the second transmitting unit comprises a second electrical input port, a second transmitting high-speed transmission circuit and a second output circuit; and the second receiving unit comprises a second electrical output port, a second receiving high-speed transmission circuit, and a second input circuit; and the USB plug connect to the device, the second transmitting unit and the second receiving unit are powered on and enter an initialization mode respectively; and under an initialization mode, the second input circuit of the second receiving unit continuously detects whether the first optical signal is transmitted from the other plug, and the second electrical output port of the second receiving unit performs receiver termination detection at an interval of t0; when a low-impedance receiver termination ($R_{RX\text{-}DC}$) is detected, the second control unit drives the second output circuit to output the first optical signal and causes the second transmitting unit to enter a transmission mode.

Optionally, when the second receiving unit is under the initialization mode, the second input circuit receives the first optical signal to cause the second receiving unit to enter a transmission mode, while the second control unit configures the second electrical input port to the low-impedance receiver termination ($R_{RX\text{-}DC}$).

Optionally, when the second receiving unit is under the transmission mode, the light transmitted from the first output circuit to the second receiving high-speed transmission circuit through the second input circuit. Wherein the light processing in the second receiving high-speed transmission circuit and sending to the device by the second electrical output port; and/or when the second transmitting unit is under a transmission mode, the USB plug receives the data transmitted from the device, while the second output circuit of the second transmitting unit emits light and transmits the data to the other plug.

1) Optionally, the operating mode of the USB plug further comprises a power saving mode; and the second input circuit of the USB plug in the power saving mode conducts polling at an interval of t3, and when the second optical signal is detected, the USB plug remains in the power saving mode; and the second input circuit under the power saving mode responds to detection of the first optical signal, while the second receiving unit enters a transmission mode from the power saving mode; and while the second transmitting unit enters the transmission mode, the second receiving unit also enters the transmission mode.

The present application also provides a USB plug capable of managing power consumption and state, wherein the USB plug is applicable to an active optical cable of an optical transmission medium, comprising:

a transmitting unit, a receiving unit, a control unit and at least one timer;

wherein the transmitting unit comprise an electrical input port, a transmitting high-speed transmission circuit, and an output circuit, wherein the electrical input port is connected to an upstream port or a downstream port for receiving an input USB electrical signal to be transmitted, and is capable of determining whether an AC signal is currently being input; and a receiver termination circuit is further provided on the electrical input port, wherein the receiver termination circuit provides a low-impedance receiver termination ($R_{RX-DC}$) in accordance with the requirements of the USB protocols, or provides a high impedance to ground of ZRX-HIGH-IMP-DC-POS in accordance with the requirements of the USB protocols; and the transmitting high-speed transmission circuit transmits the USB electric signal input by the electric input port to the output circuit after processing; and the output circuit is connected to an optical transmission medium to transmit an optical signal; and the receiving unit comprises an electrical output port, a receiving high-speed transmission circuit and an input circuit;

wherein the input circuit is connected to an optical transmission medium for receiving the optical signal converted from the USB electrical signal transmitted from an upstream port or another of the downstream ports, and is capable of determining whether an optical signal is currently being input; and the receiving high-speed transmission circuit transmits the signal output from the input circuit to the electrical output port after processing; and the electrical output port outputs a processed USB electrical signal of the received signal to one of upstream port or downstream port, and is capable of detecting the receiver termination state of the port;

wherein a control unit is used for receiving information from the transmitting unit and the receiving unit, determining the current operation modes of the transmitting unit and the receiving unit, performing corresponding control operations, and enabling the transmitting unit and the receiving unit to switch between different operation modes;

wherein a timer is used for counting time, comprising counting the duration of the electrical idle state of the electrical input port, and other time counting operations required for operating mode trip conditions, the operating modes of the transmitting unit and the receiving unit comprise an initialization mode, a transmission mode, and a power saving mode.

Optionally, for the initialization mode, the transmitting unit and the receiving unit enter the initialization mode after the USB plug has been powered on; and in this state, the receiver termination circuit of the electrical input port is configured as a high impedance to ground of ZRX-HIGH-IMP-DC-POS as required by the USB protocols, while the output circuit is non-illuminated by default; and in this state, the electrical output port performs receiver termination detection at a certain interval of t0, i. e., the Rx Detect operation, while the input circuit performs optical signal detection.

Optionally, under initialization mode, 1) if the electrical output port of the receiving unit detects a low-impedance receiver termination ($R_{RX-DC}$) as required by the requirements of the USB protocols, it is determined that the local USB plug is connected to the upstream port or the downstream port, and the control unit controls the output circuit to open to emit the first optical signal; and correspondingly, if the electrical output port of the receiving unit detects a high impedance to ground of ZRX-HIGH-IMP-DC-POS as required by the requirements of the USB protocols, it is determined that the local USB plug is not connected to the upstream port or the downstream port, and the control unit controls the output circuit not to emit optical signal/turn off optical signal, that is, the connection state of the local USB plug is determined from the receiver termination detection;

2) if the input circuit of the receiving unit detects a first optical signal from the other plug, the control unit configures the receiver termination circuit of the electrical input port of the transmitting unit of the USB plug to the low-impedance receiver termination ($R_{RX-DC}$) according to the requirements of the USB protocols;

if the input circuit of the receiving unit does not detect the first optical signal from the other plug, the control unit configures the receiver termination circuit of the electrical input port of the transmitting unit of the USB plug to present a high impedance to ground of ZRX-HIGH-IMP-DC-POS in accordance with the requirements of the USB protocols, that is, the connection state of the USB plug at the other plug is determined by the detection of whether an optical signal is received.

Optionally, the transmitting unit and the receiving unit are capable of entering the transmission mode respectively:

if that electrical output port of the receiving unit detects a low-impedance receiver termination ($R_{RX-DC}$) as required by the requirements of the USB protocols, it is determined that the USB plug is connected to the upstream port or the downstream port, and the control unit controls the transmitting unit to enter a transmission mode while transmitting the first optical signal; and when the input circuit of the receiving unit detects that the plug at the other plug sends a first optical signal, the control unit controls the receiving unit to enter transmission mode.

Optionally, the transmitting unit and the receiving unit are capable of entering the transmission mode simultaneously in order to cope with the first unconventional plugging and unplugging situation of the present application:

Condition 1: The electrical output port of the receiving unit detects a low-impedance receiver termination ($R_{RX-DC}$) as required by the requirements of the USB protocols, and Condition 2: the input circuit of the receiving unit detects a first optical signal transmitted by the other plug only if both Condition 1 and Condition 2 are satisfied shall the control unit allow both the transmitting unit and the receiving unit to enter a transmission mode, and shall the receiver termination detection operation of the electrical output port of the receiving unit stop.

Optionally, the power consumption of the USB plug under the initialization mode is less than that of the transmission mode, and the operating state of each component in the initialization mode after the USB plug is powered on is that all circuits are inactive, except that the receiver termination circuit of the electrical input port of the transmitting unit required to present a high impedance to ground of ZRX-HIGH-IMP-DC-POS in accordance with the requirements of the USB protocols, and that the receiver termination detection circuit of the electrical output port of the receiving unit and the optical signal detection circuit of the input circuit required to be in the operating state, or be in the operating state at a certain time interval.

Optionally, for the transmission mode of the transmitting unit and the receiving unit, wherein the high-speed signal transmission circuit of the transmitting unit and the receiving unit are in operation and capable of transmitting signals, and the transmitting unit and the receiving unit can be switched from the transmission mode to the power saving mode.

Optionally, the transmitting unit switches from the transmission mode to the power saving mode through the method as follows:

the electrical input port of the transmitting unit of the USB plug continuously performs AC signal detection, if there is no AC signal input, the transmission path is in an electrical idle state, and when the electrical idle state exceeds t1 time, the control unit control the transmitting unit of the USB plug to enter the power saving mode;

and/or, the receiving unit switches from the transmission mode to the power saving mode through the method as follows:

the input circuit of the receiving unit of the USB plug continuously detects whether the optical signal is transmitted; once there is no optical signal detected, the control unit of the USB plug control the receiving unit of the USB plug to enter the power saving mode.

Optionally, for the power saving mode of the transmitting unit:

wherein under this mode, the majority of circuits in the transmitting unit are inactive; in particularly, the high-speed transmission circuit of the transmitting unit is inactive and the output circuit is non-illuminated; while the receiver termination circuit of the electric input port needs to keep the low-impedance receiver termination ($R_{RX-DC}$) as required by the requirements of the USB protocols;

In order be able to perform checking and transmission of the connection state of the plugs and ports at both ends under power saving mode, and to ensure that it can be woken up from the power saving mode in time, only a very small number of circuits are in operation or are woken up to work at a certain time; in particularly, the electric input port of the transmitting unit detects the AC signal input, and once the AC signal is detected, then the control unit wakes up the relevant circuits such as the high-speed signal transmission channel of the transmitting unit, causing the transmitting unit of the USB plug to enter a transmission mode, and send a first optical signal; if the receiving unit of the USB plug is also in the power saving mode at this time, the control unit is capable of waking up the high-speed signal transmission channel of the receiving unit and other relevant circuits selectively, causing the receiving unit of this USB plug to enter transmission mode as well.

Optionally, for the power saving mode of the receiving unit, wherein under this mode, the majority of circuits are inactive, comprising the high-speed transmission circuit.

In order to be able to perform checking and transmission of the connection state of the plugs and ports at both ends under power saving mode, and to ensure that it can be woken up from the power saving mode in time, only a very small number of circuits, comprising the circuit for detecting the receiver termination state of the port, and the circuit for detecting the optical signal input by the input circuit, are in the operation, or are woken up to operate at a certain time.

Optionally, in order to be able to perform checking and transmission of the connection state of the plugs and ports at both ends under power saving mode, and to ensure that the plug can be woken up from the power saving mode in time, the circuit for detecting the termination state of the port, and the circuit for detecting the optical signal input by the input circuit, are in the operation, or are woken up to operate at a certain time, in specifically:

1) the electrical output port of the receiving unit performs receiver termination detection at a certain interval of t2; if the detection result proves that the connected upstream port or the downstream port is in the connected state, the receiver termination circuit of the electrical input port of the transmitting unit of the USB plug continues to maintain a low-impedance receiver termination ($R_{RX-DC}$) state as required by the requirements of the USB protocols, and the control unit wakes up the output circuit of the transmitting unit, sends the second optical signal to the plug at the other plug, and then turns off the light again to enter the inactive state, at which time both the receiving unit and the transmitting unit of the plug maintain the power saving mode; if the detection result proves that the upstream port or the downstream port to which it is connected has been disconnected, the control unit controls the transmitting unit and the receiving unit of the USB plug to enter the initialization mode, causing the receiver termination circuit of an electrical input port of a transmitting unit to present a high impedance to ground of ZRX-HIGH-IMP-DC-POS as required by the requirements of the USB protocols;

2) the input circuit of the receiving unit continuously detects whether an optical signal has been transmitted; If a first optical signal is detected, the control unit wakes up the relevant circuit such as the high-speed signal transmission circuit of the receiving unit of the plug to cause the receiving unit of the USB plug to enter a transmission mode; also, the control unit is capable of waking up the high-speed signal transmission circuit and other relevant circuits of the USB plug transmitting unit selectively to cause the transmitting unit of the USB plug to enter a transmission mode; if a second optical signal is detected, the transmitting unit and receiving unit of the USB plug remain in their current state and still be in the power saving mode; if no optical signal input is detected after a certain time of t3, the control unit controls the transmitting unit and receiving unit of the USB plug to enter the initialization mode, causing the receiver termination circuit of the electrical input port of the transmit unit to present a high impedance to ground of ZRX-HIGH-IMP-DC-POS as required by the requirements of the USB protocols.

Optionally, the setting of t3 needs to be longer than the setting of other plug t2 to which it is matched.

Optionally, in order to cope with the second unconventional plugging and unplugging situation of the present application, and to avoid the resulting mismatch of states at both ends of the USB system.

After the electrical output port of the receiving unit detects that the upstream or downstream port to which it is connected has been disconnected, the non-illuminated state of the USB plug is maintained for more than t4 time or the USB plug is made to wait for a mandatory t4 time before the control unit then controls the transmitting unit and the receiving unit of the USB plug to enter the initialization mode.

Optionally, the setting of t3 should be between t2 and t2+t4 for the other plug to which it is matched, and the time difference between the two plug timers needs to be taken into account Optionally, the second optical signal has a power or frequency different from that of the first optical signal, and is capable of transmitting the information that the USB plug and the port of the local end are still connected, but will not trigger a mode switch, allowing the transmitting unit and the receiving unit of the USB plug at the other plug to maintain a power saving mode;

and/or, the t2 time of the USB plug should be set for less than 100 ms.

The present application further discloses a USB active optical cable utilizing the USB plug, comprising:

a first plug, a second plug, and an optical transmission medium connecting the first plug and the second plug;
wherein the first plug and the second plug are both the USB plugs, the transmitting unit of the first plug corresponds to the receiving unit of the second plug, and the receiving unit of the first plug corresponds to the transmitting unit of the second plug.

The present application features the advantages as follows:

1) Based on the independent control of the transmitting unit and the receiving unit, the operating states of the transmitting unit and the receiving unit of the active optical cable are divided into the initialization mode, the power saving mode and the transmission mode, and necessary operation requirements and mode switch conditions are proposed for each mode, thus facilitating the power consumption management of the active optical cable;

2) When under the initialization mode, in particularly the power saving mode, a method is proposed to check and match the termination state of the transmission ports, enabling the USB active cable to maintain a unified state.

3) In the case of USB plugs with two different situations of unconventional plugging and unplugging, the mode switching has been tailored to distinguish between the many different applications of complete disconnection and unconventional plugging and unplugging.

4) The present application is applicable to both Optically Isolated Active Cable and hybrid cables of various power supply modes.

Figure 1:
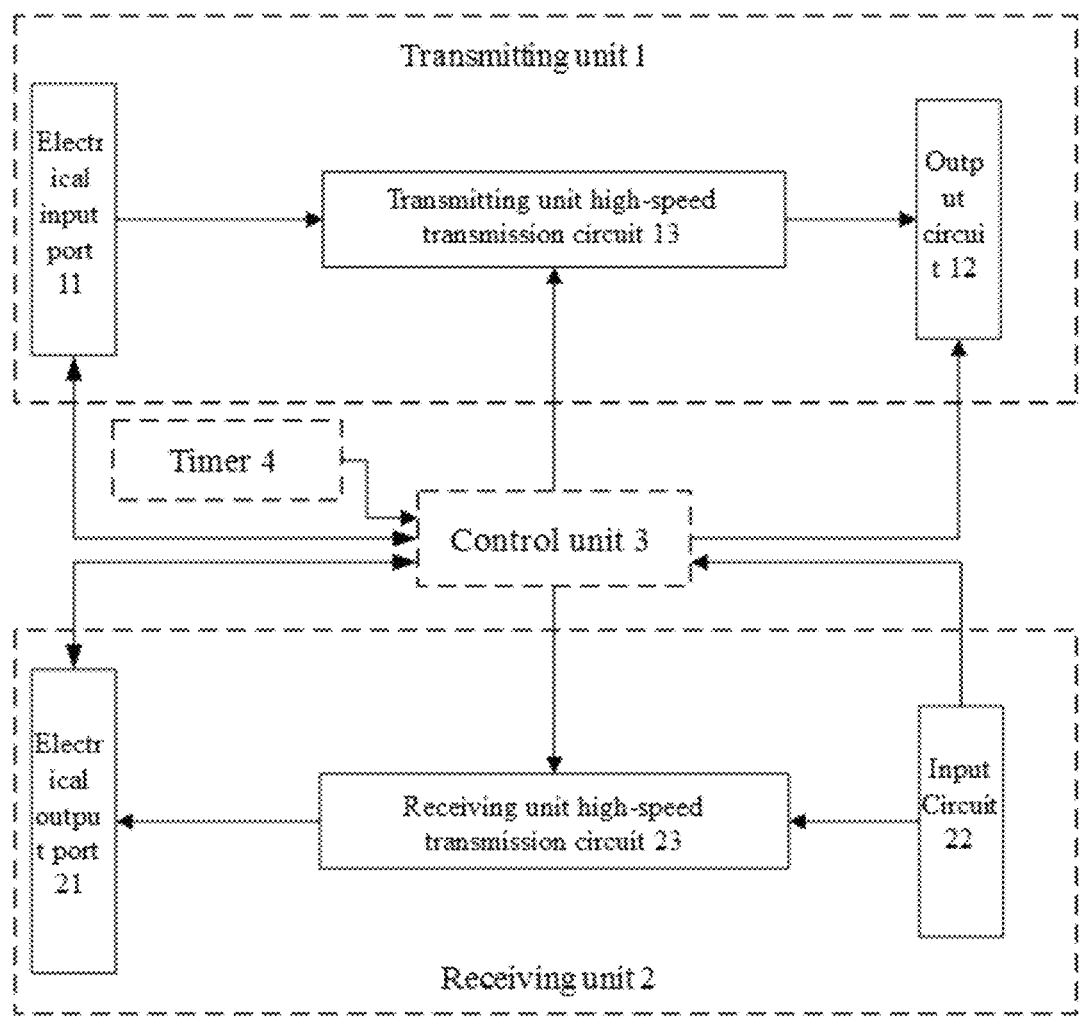
FIG. 1 illustrates a schematic diagram of a USB plug capable of managing power consumption and state according to a specific embodiment of the present application.

The technical features to which the appended markings in the drawings refer respectively are: 100, First plug; 200, Second plug; 300, Optical transmission medium; 1, Transmitting unit; 11, Electrical input port; 12, Output circuit; transmitting unit high-speed transmission circuit 13, Transmitting unit high-speed transmission circuit; 2, Receiving unit; 21, Electrical output port; 22, input circuit; receiving unit high-speed transmission circuit 23, Receiving unit high-speed transmission circuit; 3. Control unit; 4, Timer; 310, First plug; 320, First transmitting unit; 322, First electrical input port; 324, First transmitting high-speed transmission circuit; 326, First output circuit; 330, First control unit; 340, First receiving unit; 342, First electrical output port; 344, First receiving high-speed transmission circuit; 346, First input circuit; 350, Second plug; 360, Second transmitting unit; 362, Second electrical input port; 324, Second transmitting high-speed transmission circuit; 366, Second output circuit; 370, Second control unit; 380, Second receiving unit; 382, Second electrical output port; 384, Second receiving high-speed transmission circuit; 386, Second input circuit.

DETAILED EMBODIMENTS

The present application is described in further detail below with reference to the appended drawings and embodiments. It is understood that the specific embodiments described herein are intended only to explain the present application rather than limiting it. It is also to be noted that, for ease of description, only parts of the structure relating to the present application are shown in the appended drawings and not all of it.

In the present application, the corresponding definitions are given as follows:

Based on the USB protocols, the port on the host or hub connected to the device is called the downstream port, while the port connected to the host or hub on the device is called the upstream port. A USB cable is provided with 2 plugs, which may be referred to as a first plug and a second plug for ease of differentiation, wherein the plug into the downstream port is called the first plug, and the plug into the upstream port is called the second plug. Both the first plug and the second plug are provided with a transmitting unit and a receiving unit. The USB transmission is bi-directional, and in order to distinguish between the two data streams, the two directions of the bi-directional data stream are referred to as the first and the second direction.

The first direction refers to a direction in which data is transmitted from the downstream port to the upstream port, which may also be referred to as the downstream direction; and the second direction refers to a direction in which data is transmitted from the upstream port to the downstream port, which may also be referred to as the upstream direction.

The present application mainly lies in: based on the separate control of the transmitting unit and the receiving unit, the control unit is used to detect the state of each port or circuit of the transmitting unit and the receiving unit, and the operating states of the transmitting unit and the receiving unit in the USB plug of the active optical cable are divided into the initialization mode, the power saving mode and the transmission mode, while necessary operating requirements and mode switching conditions are provided for each mode, thus facilitating power consumption management of the active optical cable; furthermore, for the initialization mode of the transmitting unit and the receiving unit, in particular the power saving mode, a method is proposed for checking and transmitting the state of the Receiver termination of the port, enabling the USB system comprising an upstream port, an active cable and a downstream port to maintain a unified state; also, two different application cases are considered for complete disconnection and unconventional plugging and unplugging. The present application is also applicable to both Optically Isolated Active Cable and hybrid cables of various power supply modes.

It is to be noted that in the present application, the transmission modes of the transmitting unit and the receiving unit in the USB plug of the active optical cable correspond to the states of U0 and U1 in the USB protocols, in which state no receiver termination (Receiver termination) state check of the port is required.

Refer to FIG. 1, which illustrates a schematic diagram of a USB plug capable of managing power consumption and state, the USB plug is applicable to active optical cable with transmission medium such as optical fibers, and may serve as a first plug and a second plug thereof, In accordance with the present application, both the first plug and the second plug are of the same structure, which is schematically illustrated in the drawings. In the following description, the specific structure and operating principle of the USB plug are explained by taking the first plug 100, which is connected to the downstream port, as an example, and the second plug 200, which is connected to the upstream port, operates on the same principle as that of the first plug.

In particular, the USB plug comprises a transmitting unit 1, a receiving unit 2, a control unit 3 and at least one timer 4;

wherein the transmitting unit 1 comprises an electrical input port 11, a transmitting unit high-speed transmission circuit 13, and an output circuit 12, wherein the electrical input port 11 is connected to an upstream port or a downstream port, and is configured for receiving an input USB electrical signal to be transmitted, and is capable of determining whether an AC signal is currently being input; for example, when the USB plug is connected to the upstream port, it receives the USB electrical signal output from the upstream port and determines whether an AC signal is currently being input.

The electrical input port 11 is also provided with a receiver termination circuit, wherein the receiver termination circuit provides a low-impedance receiver termination ($R_{RX-DC}$) in accordance with the requirements of the USB protocols, or a high impedance to ground of ZRX-HIGH-IMP-DC-POS in accordance with the requirements of the USB protocols; and the transmitting unit high-speed transmission circuit 13 transmits the USB electrical signal input from the electrical input port 11 to the output circuit 12 after being processed.

The output circuit 12 is connected to an optical transmission medium to transmit an optical signal; and the receiving unit 2 comprises an electrical output port 21, a receiving unit high-speed transmission circuit 23 and an input circuit 22;

wherein the input circuit 22 is connected to an optical transmission medium, and is configured for receiving an optical signal converted from a USB electrical signal transmitted from an upstream port or another of the downstream ports, and is capable of determining whether an optical signal is currently being input; for example, when the USB plug is connected to the upstream port, the input circuit 22 of the receiving unit 2 of the USB plug receives the optical signal transmitted from the transmitting unit 1 of the USB plug connected to the downstream port of the other plug.

The receiving unit high-speed transmission circuit 23 transmits the signal output from the input circuit 22 to the electrical output port 21 after being processed; and the electrical output port 21 outputs the processed USB electrical signal of the received signal to one of the upstream port or the downstream port, and is capable of detecting the Receiver termination state of the port.

The control unit 3 is configured for receiving relevant information from the transmitting unit 1 and the receiving unit 2, determining the current operation modes of the transmitting unit and the receiving unit, performing corresponding control operations, and enabling the transmitting unit and the receiving unit to switch between different operation modes respectively.

Timer 4 is used for performing a time count and is able to count the duration of the electrical input port electrical idle state, and other time counting operations required for operating mode switch conditions, the operation modes of the transmitting unit 1 and the receiving unit 2 comprise an initialization mode, a transmission mode, and a power saving mode.

With regard to the initialization mode, the transmitting unit 1 and the receiving unit 2 enter the initialization mode after the USB plug is powered on.

When the transmitting unit is under this state, the receiver termination circuit (receiver termination circuit of the electrical input port is configured as a high impedance to ground of ZRX-HIGH-IMP-DC-POS in accordance with the USB protocols, and the output circuit defaults to a non-illuminated state. In this state, the electrical output port performs receiver termination detection at a certain time interval of t0, that is, Rx Detect operation, and the input circuit performs optical signal detection.

The interval t0 is preferred to be a value of less than 12 ms, for example 8 ms or less.

In initialization mode:

1) If the electrical output port 21 of the receiving unit 2 detects a low-impedance receiver termination ($R_{RX-DC}$) in accordance with the requirements of the USB protocol, it is determined that the USB plug is connected to the upstream port or the downstream port, and the control unit 3 controls the switch of the output circuit 12 to emit the first optical signal; and correspondingly, if the electrical output port 21 of the receiving unit 2 detects a high impedance to ground of ZRX-HIGH-IMP-DC-POS in accordance with requirements of the USB protocols, it is determined that the USB plug is not connected to the upstream port or the downstream port, and the control unit 3 controls the output circuit 12 not to emit light/turn off light.

That is, the connection state of the local USB plug is determined from the receiver termination detection.

2) If the input circuit 22 of the receiving unit 2 detects a first optical signal transmitted from the other plug of the cable, the control unit 3 configures the receiver termination circuit of the electrical input port 11 of the transmitting unit 1 of this USB plug to maintain a low-impedance receiver termination ($R_{RX-DC}$) in accordance with the requirements of the USB protocols, if the input circuit 22 of the receiving unit 2 detects no first optical signal transmitted from other plug of cable, the control unit 3 configures receiver termination circuit of the electrical input port 11 of the transmitting unit 1 of the USB plug to present a high impedance to ground of ZRX-HIGH-IMP-DC-POS in accordance with the requirements of the USB protocols; it can be seen that the first optical signal has a certain power or frequency, thus enabling the input circuit of the receiving unit of the opposite USB plug to be distinguished.

That is, the connection state of the USB plug at the other plug is determined by detection of whether a optical signal is received.

3) The transmitting unit and the receiving unit are able to enter a transmission mode respectively:

if the electrical output port 21 of the receive unit 2 detects a low-impedance receiver termination ($R_{RX-DC}$) in accordance with the USB protocols, it is determined that the USB plug is connected to the upstream port or the downstream port, and the control unit 3 controls the transmitting unit 1 to enter a transmission mode while transmitting the first optical signal; and when the input circuit 22 of the receiving unit 2 detects a first optical signal transmitted by the plug at the other plug, the control unit 3 controls the receiving unit 2 into transmission mode.

That is, the criteria for determining the entry of the transmitting unit and the receive unit into the transmission mode are independent from each other;

4) Furthermore, there is a unconventional plugging and unplugging situation in the use of USB active optical cables, where the USB plug at the local end is connected to the upstream port or the downstream port, and the USB plug at the local end is disconnected for human or fault reasons while the USB plug at the other plug has not been connected, that is, the first case of unconventional plugging and unplugging situation in the present application.

Therefore, in order to prevent the USB active optical cable from responding to the plugging and unplugging state of both ends in time under such an unconventional situation, the transmitting unit and the receiving unit are controlled to enter a transmission mode simultaneously by the method as follows:

only if

Condition 1: the electrical output port 21 of the receiving unit 2 detects a low-impedance receiver termination ($R_{RX-DC}$) in accordance with the requirements of the USB protocols, and Condition 2: the input circuit 22 of the receiving unit 2 detects a first optical signal transmitted from the plug at the other plug, only when both Condition 1 and Condition 2 are satisfied at the same time shall the control unit 3 allow both the transmitting unit 1 and the receiving unit 2 to enter a transmission mode, and only then shall the receiver termination detection operation of the electrical output port of the receiving unit stop.

In particular,

When only Condition 1 is satisfied and Condition 2 is not, the operation mode of the local plug does not switch according to this embodiment, and the receiver termination detection of the local plug continues simultaneously with the optical signal detection and does not stop. At this time, the local plug changes from the connected state to the disconnected state, and the local plug is capable of detecting the state change, and transmit the state change to the other plug by closing the optical path at the same time, thus realizing the real-time transmission of the state change, and preventing the other plug from entering the transmission mode by mistake when the local plug is disconnected again, and the other plug also transmits this state change to the upstream port/downstream port to which the other plug is connected by setting receiver termination circuit of the electrical input port 11 of the transmitting unit 1 of the other plug to a high impedance to ground of ZRX-HIGH-IMP-DC-POS in accordance with the requirements of the USB protocols;

Similarly, when only Condition 2 is satisfied and Condition 1 is not, the operation mode of the local plug does not switch according to this embodiment, and the receiver termination detection of the local plug continues simultaneously with the optical signal detection and does not stop. At this time, the other plug changes from the connected state to the disconnected state, and the local plug is capable of detecting the state change by failing to detect the optical signal, thus ensuring not to enter the transmission mode by mistake, and the other plug also transmits this state change to the upstream port/downstream port to which the other plug is connected by configuring the receiver termination circuit of the electrical input port 11 of the transmitting unit 1 of the other plug to a high impedance to ground of ZRX-HIGH-IMP-DC-POS in accordance with the requirements of the USB protocols;

Therefore, by setting that both the transmitting unit 1 and the receiving unit 2 enter a transmission mode when both Conditions 1 and 2 are satisfied at the same time, it is possible to avoid incorrect entry of the local plug into transmission mode under the first unconventional plugging and unplugging situation, which may further lead to incorrect setting of the state of the local plug or even the other plug.

5) The initialization mode consumes less power than the transmission mode.

Preferably, the operating state of each component in the initialization mode after the USB plug is powered on is that all circuits are inactive, except that the receiver termination circuit of the electrical input port of the transmitting unit needs to be configured as a high impedance to ground of ZRX-HIGH-IMP-DC-POS in accordance with the requirements of the USB protocols, and the receiver termination detection circuit of the electrical output port of the receiving unit and the optical signal detection circuit of the input circuit need to be in the operating state, or be in the operating state at a certain time interval.

With respect to the transmission mode of the transmitting unit and the receiving unit, wherein: the relevant circuits such as high-speed signal transmission circuits of the transmitting unit and the receiving unit are in an operating state to enable signal transmission; while the transmitting unit and the receiving unit are capable of switching from the transmission mode to the power saving mode.

Based on the USB protocols, if a port (upstream port or downstream port) enters a certain power saving state, the port sends a message to the other plug port, causing the opposite port to enter the same power saving state as well, thus maintaining a unified state of the entire USB system. By following this behavior, the two directions of the active optical cable of the present application can be determined independently in terms of power saving mode, thus leading to a final result of unified state of the entire USB system. In addition, independent power saving mode determination in both directions of the active optical cable also facilitates support for the compliance mode state and the U1 state in the USB protocols. Compliance mode is a test mode specified by the USB protocols, in which the USB system continuously transmits signals in only one direction, while the other direction is idle most of the time. And the U1 state requires the transmission of ping.LFPS signals in only one direction.

The transmitting unit switches from the transmission mode to the power saving mode through the method as follows:
the electric input port 11 of the transmitting unit 1 of the USB plug continuously performs AC signal detection, if there is no AC signal input, the transmission path is in an electrical idle state at this time, and when the electrical idle state exceeds t1 time, the control unit 3 controls the transmitting unit of the USB plug to enter the power saving mode.

Preferably, the t1 time is a time setting greater than 300 ms. t1 can be counted with a timer.

For the USB active optical cable comprising two USB plugs, the electrical input ports of the transmitting units of the two USB plugs can continuously perform AC signal detection and enter the power saving mode based on the detection result.

The receiving unit switches from the transmission mode to the power saving mode through method as follows:
the input circuit 22 of the receiving unit 2 of the USB plug continuously detects whether the optical signal is transmitted; once there is no optical signal detected, the control unit 3 of the USB plug controls the receiving unit of the USB plug to enter the power saving mode.

In respect of the power saving mode of the transmitting unit:
wherein under this mode, the majority of circuits are inactive; for example, the transmitting unit high-speed transmission circuit 13 does not operate, and the output circuit 12 is non-illuminated, but the receiver termination circuit of the electrical input port 11 needs to maintain a low-impedance receiver termination ($R_{RX-DC}$) as required by the USB protocols.

In order to be able to check and transmit the connection state of the plugs at both ends and the ports in the power saving mode, and ensure that they can be woken up in time from the power saving mode, only a small number of circuits are in operating mode, or they are woken up to operate for a certain time; for example, the electric input port 11 of the transmitting unit 1 detects the AC signal input as follows: the electrical input port 11 of transmitting unit 1 continuously detects whether an AC signal is being input; once an AC signal is detected to be input, the control unit 3 wakes up relevant circuits such as high-speed signal transmission channel of transmitting unit, causing the transmitting unit of the USB plug to enter transmission mode and to emit a first optical signal; and
if the receiving unit of the USB plug is also in the power saving mode at this time, the control unit 3 can wake up the high-speed signal transmission channel and other relevant circuit of the receiving unit selectively, causing the receiving unit of the USB plug to enter a transmission mode as well;

In respect of the power saving mode of the receiving unit, wherein under this mode, the majority of circuits are inactive, comprising the receiving unit high-speed transmission circuit 23 as an example.

In order to be able to check and transmit the connection state of the plugs of both ends and the ports in the power saving mode, and to ensure that they can be woken up from the power saving mode in time, only a small number of circuits are in the operating state, or they are woken up to operate for a certain time, for example, a circuit for detecting the port receiver termination state of the electric output port 21 and a circuit for detecting the optical signal input by the input circuit 22, which are specified as follows:
1) the electrical output port 21 of the receiving unit 2 performs receiver termination detection according to a certain time interval of t2; if the detection result proves that the upstream port or the downstream port to which it is connected is always connected, receiver termination circuit of the electrical input port 11 of transmitting unit 1 of the USB plug continues to maintain a low-impedance receiver termination ($R_{RX-DC}$) in accordance with the requirements of the USB protocols, and the control unit 3 wakes up the output circuit 12 of the transmitting unit 1, sends a second optical signal to the other plug, and then turns off the light again to enter the inactive state; at this time, both the receiving unit 2 and the transmitting unit 1 of the plug maintain the power saving mode; if the detection result proves that the upstream port or the downstream port to which it is connected has been disconnected, the control unit 3 controls the transmitting unit 1 and the receiving unit 2 of the USB plug to enter the initialization mode, causing the receiver termination circuit of the electrical input port 11 of the transmitting unit 1 to be configured as a high impedance to ground of ZRX-HIGH-IMP-DC-POS in accordance with the USB protocol requirements;
2) the input circuit 22 of the receiving unit 2 continuously detects whether an optical signal is being transmitted; if a first optical signal is detected, the control unit 3 wakes up the relevant circuits such as the high-speed signal transmission circuit of the receiving unit 2 of the plug to enable the receiving unit of the USB plug to enter a transmission mode; at the same time, the control unit 3 can wake up the high-speed signal transmission circuit and other relevant circuits of the USB plug transmitting unit 1 selectively to enable the transmitting unit of the USB plug to enter a transmission mode; if a second optical signal is detected, the transmitting unit and receiving unit of the USB plug remain in the their current state and are still in the power saving mode; if no optical signal input is detected after a certain period of t3 time, the control unit 3 controls the transmitting unit and the receiving unit of the USB plug to enter the initialization mode, causing receiver termination circuit of the electrical input port 11 of the transmitting unit 1 to present a high impedance to ground of ZRX-HIGH-IMP-DC-POS in accordance with the USB protocol requirements.

It can be seen that the second optical signal has a power or frequency different from the first optical signal, and is capable of transmitting the information that the USB plug and the port of the local end are still in the connection state, but does not trigger a mode switching, allowing the transmitting unit and the receiving unit of the USB plug at the other plug to maintain a power saving mode.

Preferably, the t2 time of the USB plug shall be set to be less than 100 ms.

The setting of t3 needs to be longer than the setting of other plug t2 to which it is matched, preferably in the order of milliseconds.

3) Furthermore, the second unconventional plugging and unplugging situation of the present application exists in the use of the USB plug, that is, an extremely fast disconnection and reconnection operation with the upstream port or downstream port due to human or fault reasons; this special situation will cause the USB plug connected to enter a transmission mode from the initialization mode immediately after entering the initialization mode from the power saving mode. However, at this time, the plug at the other end may not have timed out to t3, so the other plug will not be aware of this unconventional plugging and unplugging and will not be able to pass on this unconventional plugging and unplugging to the connected downstream or upstream port, which will cause the state of the upstream port and the downstream port to be inconsistent, thus affecting communication.

Preferably, in order to avoid mismatches in the state of the two ends of the USB system caused by unconventional plugging and unplugging, for the USB plug does not power off after disconnection, after the electrical output port 21 of the receiving unit 2 detects that the connected upstream port or the downstream port has been disconnected, it is necessary to maintain the non-illuminated state of the USB plug for more than t4 time, and then the control unit 3 controls the transmitting unit and the receiving unit of the USB plug to enter the initialization mode. The purpose of continuing to maintain the non-illuminated state for longer than t4 is to ensure the timeout of t3 of the USB plug at other plug, and prevent the other plug USB plug from switching to the transmission mode directly without entering the initialization state, thus causing the state of the ports at both ends of the USB system to be inconsistent.

For the USB plug that powers off after disconnection, the plug itself has no power; and the USB plug does not record the state before power off after being powered on, therefore, it is necessary to make the USB plug to wait for t4 time after power-on, during which time the transmitting unit not illuminated, and the receiving unit does not perform receiver termination detection and optical signal detection; then the control unit 3 controls the transmitting unit and receiving unit of the USB plug to enter the initialization mode. This also serves to maintain the non-illuminated state for longer than t4 time, thus preventing the other USB plug from switching to the transmission mode directly without entering the initialization state, thus causing the problem with the state of the ports at both ends of the USB system not being unified.

In this case, the setting of t3 shall be between t2 and t2+t4 of the other plug which it is matched, and the time difference between the two plug timers needs to be taken into account Second plug and first plug in the present application share the same operating mechanism In a first plug, the present application uses a timer as an illustrative time counting operation, but the present application is not limited to this and other devices with a time counting function are also possible. Alternatively, a time counting signal may be obtained from the outside of the plug by means of a heartbeat etc., all of which are within the scope of the timer of the present application.

Figure 2:
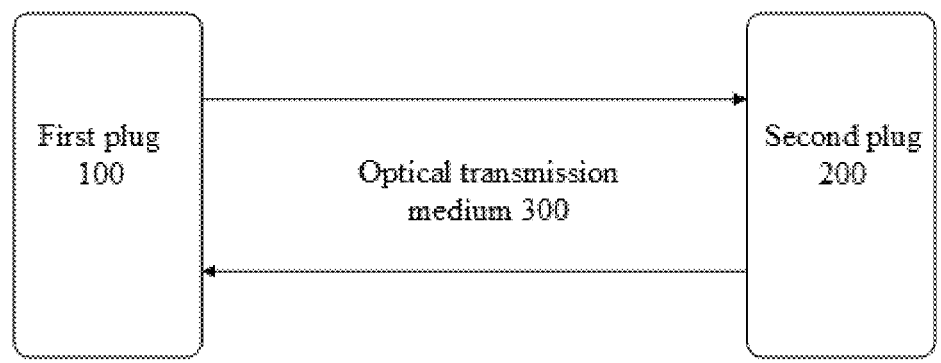
FIG. 2 illustrates a schematic diagram of a USB active optical cable capable of managing power consumption and state according to a specific embodiment of the present application.

Refer to FIG. 2, the present application further discloses a USB active optical cable using the USB plug, comprising a first plug 100, a second plug 200, and an optical transmission medium 300 connecting the first plug and the second plug;

wherein the first plug and the second plug are both USB plugs of the present application, the transmitting unit of the first plug corresponds to the receiving unit of the second plug, and the receiving unit of the first plug corresponds to the transmitting unit of the second plug.

In particular,

In a first direction, that is. in a downstream direction, the transmitting unit of the first plug receives the electric signal output from the downstream port, then converts it into optical signal through processing, and transmits it to the receiving unit of the second plug through the optical transmission medium; the receiving unit of the second plug receives the optical signal transmitted from the optical transmission medium, and then converts the signal into the required electric signal after processing and then transmits it to the receiving end of the upstream port.

In a second direction, that is. in an upstream direction, the transmitting unit of the second plug receives the electric signal output from the upstream port, then converts it into optical signal through processing, and transmits it to the receiving unit of the first plug through the optical transmission medium; the receiving unit of the first plug receives the optical signal transmitted from the optical transmission medium, then converts it into the required electric signal after processing and then transmits it to the receiving end of the downstream port.

Figure 3:
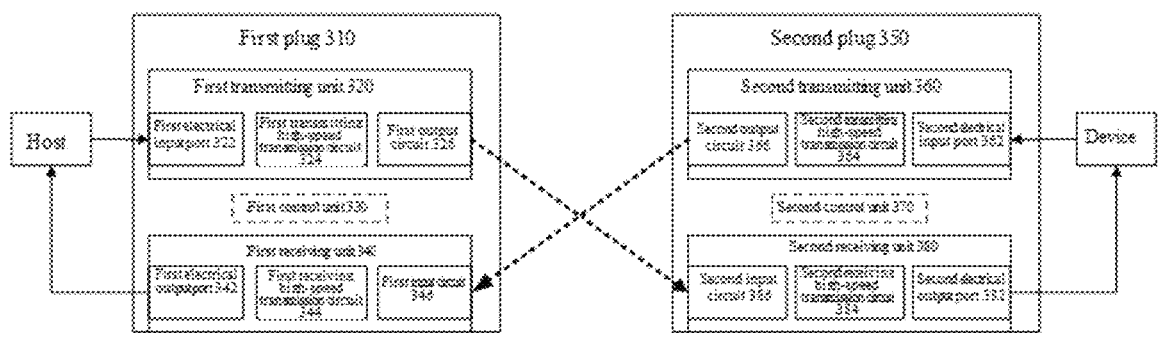
FIG. 3 illustrates a specific module diagram of a USB active optical cable capable of managing power consumption and state according to a specific embodiment of the present application.

Furthermore, refer to FIG. 3, which illustrates a specific module diagram of a USB active optical cable capable of managing power consumption and state according to a specific embodiment of the present application. The USB active cable comprises a first plug 310, a second plug 350, and an optical transmission medium connecting the first plug and the second plug, and the first plug 310 and the second plug 350 feature the same components and functions as the USB plug described in the present application.

The first plug 310 is used to connect to a host, comprises a first transmitting unit 320, a first receiving unit 340, and a first control unit 330; and the first transmitting unit 320 comprises a first electrical input port 322, a first transmitting high-speed transmission circuit 324, and a first output circuit 326; and the first receiving unit 340 comprises a first electrical output port 342, a first receiving high-speed transmission circuit 344, and a first input circuit 346;

wherein the second plug 310 is used for connecting to a device, comprising a second transmitting unit 360, a second receiving unit 380, and a second control unit 370;

the second transmitting unit 360 comprises a second electrical input port 362, a second transmitting high-speed transmission circuit 364 and a second output circuit 366; and the second receiving unit 380 comprises a second electrical output port 382, a second receiving high-speed transmission circuit 384, and a second input circuit 386.

The following embodiments describe the specific switching process of the USB active cable from the initialization mode, the transmission mode, and the power saving mode respectively.

Embodiment 1

This embodiment is used to describe that the USB plug enters the initialization mode and switches from the initialization mode to the transmission mode after the USB active cable is connected the host or the device.

(1) When the first plug 310 is connected to the host:
in respond to the first plug 310 being connected to the host, the first transmitting unit and the first receiving unit are powered on and enter an initialization mode respectively;
under an initialization mode, the first receiving unit continuously detects a first optical signal through the first input circuit 346;
under an initialization mode, the first electrical output port 342 of the first receiving unit performs receiver termination detection at an interval of t0; when a low-impedance receiver termination ($R_{RX-DC}$) is detected, the first control unit causes the first output circuit 326 to output the first optical signal, and causes the first transmitting unit 320 to enter a transmission mode.

(2) When the second plug 350 is connected to the device:
in respond to the second plug 350 being connected to the device, the second transmitting unit and the second receiving unit are powered on and enter an initialization mode respectively;
under an initialization mode, the second input circuit 386 of the second receiving unit continuously detects whether a first optical signal is transmitted from the other plug;
under an initialization mode, the second electrical output port 382 of the second receiving unit performs receiver termination detection at an interval of t0; when a low-impedance receiver termination ($R_{RX-DC}$) is detected, the second control unit causes the second output circuit 366 to output the first optical signal to inform the first plug that the second plug 350 has been connected to the device, and to cause the second transmitting unit 360 to enter a transmission mode.

Optionally, the first receiving unit 340 is under the initialization mode, the first input circuit 346 receives the first optical signal to cause the first receiving unit 340 to enter a transmission mode, while the first control unit 330 configures the first electrical input port 322 to the low-impedance receiver termination ($R_{RX-DC}$) to inform the host of the state of the connection between the device and the second plug.

The second receiving unit 380 is under the initialization mode, the second input circuit 386 receives the first optical signal to cause the second receiving unit 380 to enter a transmission mode, while the second control unit 370 configures the second electrical input port 362 to the low-impedance receiver termination ($R_{RX-DC}$) to inform the device of the state of the connection of the host to the first plug.

When the first optical signal is not received, the first receiving unit remains in the initialization mode, and the power consumption of the first receiving unit under the initialization mode is less than that of the first receiving unit under the transmission mode; when the first optical signal is not received, the second receiving unit remains in the initialization mode, and the power consumption of the second receiving unit under the initialization mode is less than that of the second receiving unit under the transmission mode.

Optionally, the first transmitting unit 320 is under the transmission mode, the first plug receives the transmission data transmitted from the host, the first transmitting unit 320 emit light through the first output circuit 326 to send data to the second receiving unit 380 of the second plug 350 of the other plug; the second receiving unit 380 is under the transmission mode, the second input circuit 386 receives the light transmitted from the first output circuit 326, and processes and sends the light to the second electrical output port 382 through the second receiving high-speed transmission circuit 384, while the second electrical output port 382 sends the processed USB electric signal to the device.

Alternatively, the second transmitting unit 360 is under the transmission mode, the second plug receives the transmission data transmitted from the device, the second transmitting unit 360 emits light through the second output circuit 366 to transmit data to the first receiving unit 340 of the first plug 340 at the other plug; and
the first receiving unit 340 is under the transmission mode, the first input circuit 346 receives the light transmitted from the second output circuit 366, processes and sends the light to the first electrical output port 342 through the first receiving high-speed transmission circuit 344, while the first electrical output port 342 transmits the processed USB electrical signal to the host.

Embodiment 2

This embodiment is a further supplement to the Embodiment 1 and is used to clarify the manner in which the relevant steps are performed when the plug and host are not connected at the same time as the device.

(1) When the second plug of the USB cable has not been connected to the device while the plug is first connected to the host first:
the first input circuit 346 continuously detects a first optical signal, the first electrical input port 322 shall present high impedance to ground of ZRX-HIGH-IMP-DC-POS, and the host does not recognize the device access and does not initiate a data transmission to the device; and
once the second plug is connected to the device, the first input circuit 346 receives the first optical signal, and the first control unit 330 causes the first receiving unit 340 to enter a transmission mode, while the first electrical input port 322 is configured to a low-impedance receiver termination ($R_{RX-DC}$), and the host recognizes the device access and is able to perform data transmission.

(2) If the first plug of the USB cable has not been connected to the host while the second plug is connected to the device first,
the second input circuit 386 continuously detects a first optical signal, and the second electrical input port 362 shall present high impedance to ground of ZRX-HIGH-IMP-DC-POS, and the device does not recognize the host access and does not initiate an data transmission to the host; and
once the first plug is connected to the host, the second input circuit 386 receives the first optical signal, the second control unit 370 causes the second receiving unit 380 to enter a transmission mode, the second electrical input port 362 is configured to a low-impedance receiver termination ($R_{RX-DC}$) state, and the device recognizes the host access and is able to send data to the host

Embodiment 3

This embodiment is a further supplement to the above embodiments and is used to further define the entry into the initial state, thus preventing the problem that the port states at both ends of the USB system are not unified.

When the first plug 310 or the second plug 350 is connected to the host or the device respectively, each waits t4 time and then enters the initialization mode.

With respect to the USB plug does not power off after disconnection, the first plug 310 or the second plug 350 waits for t4 time after the first plug 310 or the second plug 350 is powered on again, that is, continues to maintain the non-illuminated state of the USB plug for longer than t4 time, and then enters the initialization mode. This is capable of preventing the other plug USB plug from switching to the transmission mode directly without entering the initialization state, thus causing the state of the ports at both ends of the USB system to be inconsistent.

Embodiment 4

The operating modes of the first plug and the second plug further comprise a power saving mode. This embodiment is used to represent how the first plug on the host side remains in the power saving mode and switches from the power saving mode to the transmission mode when the USB active optical cable is connected to the host device.

The first power output port 342 of the first plug 310 in the power saving mode performs the receiver termination detection at an interval of t2; if the receiver termination is detected as normal, that is, in connection with the host, the first control unit 330 causes the first output circuit 326 to emit a second optical signal to indicate the second plug 350 that the connection on the host side is normal; and the second input circuit 386 of the second plug 350 under the power saving mode conducts polling at an interval of t3; when the second optical signal is detected, the second plug remains in the power saving mode, at which time the second plug has received an indication that the first plug is still connected to the host, only that no data is transmitted.

Furthermore, when the host transmits data:
the first power input port 322 under the power saving mode responds to the detection of an AC signal input, first output circuit 326 outputs a first optical signal and the first transmitting unit 320 enters the transmission mode from the power saving mode; and the second input circuit 386 under the power saving mode responds to the first optical signal detected, and the second receiving unit 380 enters the transmission mode from the power saving mode, receives data from the first output circuit 326 of the first transmitting unit 320 at the other plug, and transmits the data to the device through the second power output port 382 after being processed by the second reception high speed transmission circuit 384; and while the first transmitting unit 320 enters the transmission mode, the first receiving unit 340 enters the transmission mode as well; this is because the device most likely will send data to the host after the host transmits data, thus causing the first receiving unit 340 to enter a transmission mode in advance.

Embodiment 5

This embodiment is used to illustrate how the second plug on the device side remains in the power saving mode, and switches from the power saving mode to the transmission mode when the USB active optical cable is connected to the host and the device.

The second electrical output port 382 of the second plug 350 under the power saving mode performs the receiver termination detection at interval of t2; if the receiver termination is detected as normal, that is, the device is in connection, the second control unit 370 causes the second output circuit 366 to emit a second optical signal to indicate to the first plug 310 that the connection on the device side is normal;

the first input circuit 346 of the first plug 310 under the power saving mode conducts polling at an interval of t3; when the second optical signal is detected, the first plug of the local end remains in the power saving mode, at which time the first plug has received an indication that the second plug is still connected to the device, only that no data is being transmitted.

Furthermore, when the device transmits data
the second electrical input port 362 under the power saving mode responds to the detection of the AC signal input, the second output circuit 366 outputs a first optical signal, and the second transmitting unit 320 enters a transmission mode from the power-saving mode;

the first input circuit 346 under the power saving mode detects a first optical signal, the first receiving unit 340 enters the transmission mode from the power saving mode, receives data from the second output circuit 366 of the second transmitting unit 360 at the other plug, and transmits the data to the host through the first power output port 382 after being processed by the first receiving high-speed transmission circuit 344; and while the second transmitting unit 360 enters the transmission mode, the second receiving unit 380 enters the transmission mode as well; this is because the host will most likely send data to the device after the device transmits data, thus causing the second receiving unit 380 to enter a transmission mode in advance.

Embodiment 6

This embodiment is used to describe the operating modes of the first plug 310 and the second plug 350 after the host or the device is disconnected.

When the device is disconnected, for the first plug 310 connected to the device:
the first electrical output port 342 under the power saving mode conducts polling for the receiver termination detection at an interval of t2; when the first electrical output port 342 fails to detect the low-impedance receiver termination ($R_{RX-DC}$), the first plug 310 enters the initialization mode directly to set the first electrical input port 322 to a high-impedance receiver termination; or the first plug 310 waits t4 and then enters the initialization mode, and the first electrical input port 322 is configured to the high-impedance receiver termination, and the first output circuit 326 is non-illuminated When the device is disconnected, for the second plug 350 connected to the device:
the second electrical output port 382 under the power saving mode conducts polling for the receiver termination detection at an interval of t2; when the second electrical output port 382 fails to detect the receiver termination, the second plug 350 enters the initialization mode directly to set the second electrical input port 362 to a high-impedance receiver termination; or the second plug 350 waits for t4 and then enters the initialization mode, and the second electrical input port 362 is configured to a high-impedance receiver termination, and the second output circuit 386 is non-illuminated.

Similar to Embodiment 3, the first plug 310 and the second plug 350 wait for t4 and then enters the initialization mode, which can avoid the mismatch between the ends of the USB system caused by unconventional plugging and unplugging.

Embodiment 7

This embodiment is used to describe the switch of the first plug 310 and the second plug 350 from the transmission mode to the power saving mode.

Under a transmission mode, if the first input circuit 346 and the second input circuit 386 fail to receive the optical signal for a period of time, the first control unit 330 and the second control unit 370 control the receiving unit of the USB plug to enter the power saving mode respectively; and under a transmission mode, if the first electric input port 322 and the second electric input port 362 fail to receive an AC signal for a period of time, the first control unit 330 and the second control unit 370 control the transmitting unit of the present USB plug to enter the power saving mode respectively.

Figure 4:
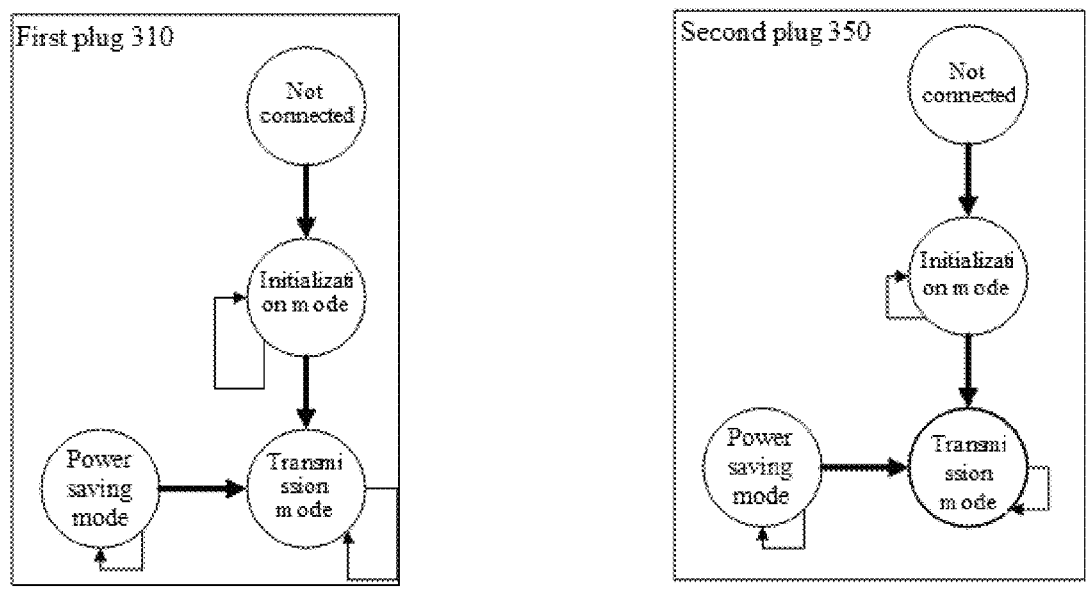
FIG. 4 illustrates a schematic diagram of mode switching of a USB active optical cable capable of managing power consumption and state according to a specific embodiment of the present application.

Refer to FIG. 4, the present application describes the mutual switching of the USB active optical cable in the initialization mode, the transmission mode and the power saving mode according to embodiments 1 to 7. It is known to those skilled in the art that the above-mentioned cables are capable of all the operating scenarios of the seven above-mentioned embodiments, or a combination of several of them, all of which fall within the scope of the protection claimed by the present application.

Embodiment 8

This embodiment is used to describe a USB plug 310 that is connected to a host, i. e., a first plug.

A USB plug adapted for connection to a host, comprising: a first transmitting unit 320, a first receiving unit 340, and a first control unit 330; and
the first transmitting unit 320 comprises a first electrical input port 322, a first transmission high-speed transmission circuit 324, and a first output circuit 326; and
the first receiving unit 340 comprises a first electrical output port 342, a first receiving high-speed transmission circuit 344, and a first input circuit 346; and
in respond to the USB plug 310 being connected to the host, the first transmitting unit and the first receiving unit are powered on and enter the initialization mode respectively; and
under an initialization mode, the first receiving unit continuously detects a first optical signal through the first input circuit 346, the first electrical output port 342 of the first receiving unit performs receiver termination detection at an interval of t0; when a low-impedance receiver termination ($R_{RX-DC}$) is detected, the first control unit causes the first output circuit 326 to output the first optical signal and causes the first transmitting unit 320 to enter a transmission mode.

Furthermore, the first receiving unit 340 is under the initialization mode, when the first input circuit 346 receives the first optical signal to cause the first receiving unit 340 to enter a transmission mode, the first control unit 330 configures the first electrical input port 322 to the low-impedance receiver termination ($R_{RX-DC}$).

Furthermore, the first transmitting unit 320 is under the transmission mode, when the USB plug receives the transmission data transmitted from the host, the first transmitting unit 320 emits light through the first output circuit 326 to transmit the data to the other plug; and/or,
the first receiving unit 340 is under the transmission mode, the first input circuit 346 receives the light transmitted from the other plug, and processes and sends the light to the first electrical output port 342 through the first receiving high-speed transmission circuit 344, while the first electrical output port 342 transmits the processed USB electric signal to the host.

1) The operating mode of the USB plug further comprises a power saving mode, wherein the first electrical output port 342 of the USB plug 310 in the power saving mode performs receiver termination detection at an interval of t2; if the receiver termination is detected as normal, the first control unit 330 causes the first output circuit 326 to emit a second optical signal;
the first electrical input port 322 under the power saving mode responds to the detection of the AC signal input, the first output circuit 326 outputs a first optical signal, and the first transmitting unit enters a transmission mode from the power-saving mode;
while the first transmitting unit 320 enters the transmission mode, the first receiving unit 340 enters the transmission mode as well.

Embodiment 9

This embodiment is used to describe the USB plug 350, i. e., a second plug, connected to the device.

A USB plug adapted for connection to a device, comprising:
a second transmitting unit 360, a second receiving unit 380, and a second control unit 370;
the second transmitting unit 360 comprises a second electrical input port 362, a second transmitting high-speed transmission circuit 364 and a second output circuit 366; and
the second receiving unit 380 comprises a second electrical output port 382, a second receiving high-speed transmission circuit 384, and a second input circuit 386; and
in respond to the USB plug 350 being connected to the device, the second transmitting unit and the second receiving unit are powered on and enter an initialization mode respectively;
under an initialization mode, the second input circuit 386 of the second receiving unit continuously detects whether a first optical signal is being transmitted from the other plug, the second electrical output port 382 of the second receiving unit performs receiver termination detection at an interval of t0; when a low-impedance receiver termination ($R_{RX-DC}$) is detected, the second control unit causes the second output circuit 366 to output the first optical signal and causes the second transmitting unit 360 to enter a transmission mode.

Furthermore, the second receiving unit 380 is under the initialization mode; when the second input circuit 386 receives a first optical signal to cause the second receiving unit 380 to enter a transmission mode, the second control unit 370 configures the second electrical input port 362 to the low-impedance receiver termination ($R_{RX-DC}$).

Furthermore, the second receiving unit 380 is under the transmission mode, the second input circuit 386 receives the light transmitted from the other plug, and processes and sends the light to the second electrical output port 382 through the second receiving high-speed transmission circuit 384, and the second electrical output port 382 sends the processed USB electrical signal to the device; and/or the second transmitting unit 360 is under a transmission mode; when the USB plug receives the transmission data transmitted from the device, the second transmitting unit 360 emits light through the second output circuit 366 to transmit the data to the other plug.

The operating mode of the USB plug further comprises a power saving mode, wherein the second input circuit 386 of the USB plug 350 under the power saving mode conducts polling at an interval of t3; when a second optical signal is detected, the USB plug remains in the power saving mode; and the second receiving unit 380 enters the transmission mode from the power saving mode to respond to the second input circuit 386 under the power saving mode detecting the first optical signal;

while the second transmitting unit 360 enters the transmission mode, the second receiving unit 380 enters the transmission mode as well.

In Embodiment 1 to Embodiment 9, t3 is a time setting of less than 100 ms, and t3 shall be set between t2 and t2+t4 of the other plug to which it is matched, and in some embodiments it is necessary to take into account the time difference between the two plugs.

First optical signal is different from second optical signal, in particular, the second optical signal has a different power or frequency from the first optical signal.

In summary, the present application features the advantages as follows:
1) Based on the independent control of the transmitting unit and the receiving unit, the operating states of the transmitting unit and the receiving unit of the active optical cable are divided into initialization mode, power saving mode and transmission mode, and necessary operation requirements and mode switch conditions are proposed for each mode, thus facilitating the power consumption management of the active optical cable;
2) In the initialization mode, in particular the power saving mode, a method is proposed to check and match the termination state of the transmission port, enabling the USB active cable to maintain a unified state.
3) In the case of USB plugs with two different situations of unconventional plugging and unplugging, the mode switching has been adapted to distinguish between the many different application cases of complete disconnection and unconventional plugging and unplugging.
4) The present application is applicable to both Optically Isolated Active Cable and hybrid cables of various power supply modes.

Apparently, it should be understood to those skilled in the art that the above described units or steps of the present application may be realized with a generic computing device, and they may be grouped together on a single computing device, or optionally, they may be realized with program code executable by a computer device, allowing them to be stored in a storage device to be executed by the computing device, or they may be realized by manufacturing separately into single integrated circuit modules, or by manufacturing multiple modules or steps of them as a single integrated circuit module. Therefore, the present application is not limited to any particular combination of hardware and software.

The detailed description set forth above, in connection with the specific preferred embodiments of the present application, is not intended to conclude that the specific embodiments of the present application are limited thereto, and that there are a number of simple derivations or substitutions that could be made by a person of ordinary skill in the art to which the present application belongs, without departing from the idea of the present application, all of which should be considered as falling within the scope of protection of the present application as determined by the submitted claims.

What is claimed is:

1. A USB active optical cable capable of managing power consumption and state, comprising a first plug, a second plug and an optical transmission medium used to connect the first plug and the second plug;

wherein the first plug is used to connect to a host, and comprises a first transmitting unit, a first receiving unit, and a first control unit, wherein the first transmitting unit, includes a first electrical input port, a first transmitting high-speed transmission circuit and a first output circuit; and the first receiving unit, includes a first electrical output port, a first receiving high-speed transmission circuit, and a first input circuit;

wherein the second plug is used to connect to a device, and comprises a second transmitting unit, a second receiving unit, and a second control unit, wherein the second transmitting unit, includes a second electrical input port, a second transmitting high-speed transmission circuit and a second output circuit; and the second receiving unit, includes a second electrical output port, a second receiving high-speed transmission circuit and a second input circuit; and in response to the first plug being connected to the host, the first transmitting unit and the first receiving unit are powered on and enter an initialization mode respectively; and under the initialization mode, the first receiving unit of the first receiving unit continuously detects a first optical signal through the first input circuit, the first electrical output port of the first receiving unit performs the receiver termination detection at an interval of t0; when a low-impedance receiver termination ($R_{RX\text{-}DC}$) is detected, the first control unit causes the first output circuit to output the first optical signal and the first transmitting unit to enter a transmission mode; and/or in response to the second plug being connected to the device, the second transmitting unit and the second receiving unit are powered on and processes the initialization mode respectively; and under the initialization mode, the second input circuit of the second receiving unit continuously detects whether the first optical signal is transmitted from the first plug, the second electrical output port of the second receiving unit performs the receiver termination detection at an interval of t0; when the low-impedance receiver termination ($R_{RX\text{-}DC}$) is detected, the second control unit causes the second output circuit to output the first optical signal to inform the first plug that the second plug has been connected to the device, and the second transmitting unit to enter the transmission mode;

wherein the first receiving unit is under the initialization mode, when the first input circuit receives the first optical signal, the first receiving unit processes the transmission mode, the first control unit configures the first electrical input port to the low-impedance receiver termination ($R_{RX\text{-}DC}$) and informs the host the state of the connection of the device to the second plug;

wherein when the second receiving unit is under the initialization mode, when the second input circuit receives the first optical signal, the second receiving unit enters the transmission mode, the second control unit configures the second electrical input port to the low-impedance receiver termination ($R_{RX\text{-}DC}$) and informs the device of the connection of the host to the first plug;

the respective operation modes of the first plug and the second plug also comprise a power saving mode;

wherein the first electrical output port of the first plug in the power saving mode performs the receiver termination detection at an interval of t2 and, if the receiver termination is in low-impedance receiver termination, the first control unit causes the first output circuit to emit a second optical signal; and the second input circuit of the second plug-in the power saving mode conducts polling at an interval of t3, and when the second optical signal is detected, the second plug remains in the power saving mode.

2. The USB active optical cable according to claim 1, wherein if the first input circuit does not receive the first optical signal;. the first receiving unit remains in the initialization mode, the power consumption of the first receiving unit in the initialization mode is less than that of the first receiving unit in the transmission mode.

if the second input circuit does not receive the first optical signal, the second receiving unit remains in the initialization mode, the power consumption of the second receiving unit in the initialization mode is less than that of the second receiving unit in the transmission mode.

3. The USB active optical cable according to claim 1, wherein when the first transmitting unit is under the transmission mode, when the first plug receives data transmitted from the host, the first output circuit of the first transmitting unit emits light and transmits the data to the second receiving unit of the second plug; and when the second receiving unit is under the transmission mode, the light transmitted from the first output circuit to the second receiving high-speed transmission circuit through the second input circuit; wherein the light processing in the second receiving high-speed transmission circuit and sending to the device by the second electrical output port.

4. The USB active optical cable according to claim 3, wherein when the second transmitting unit is under the transmission mode, when the second plug receives data transmitted from the device, the second output circuit of the second transmitting unit-emits light and transmits the data to the first receiving unit of the first plug; and when the first receiving unit is under the transmission mode, the light transmitted from the second output circuit to the first receiving high-speed transmission circuit through the first input circuit; wherein the light processing in the first receiving high-speed transmission circuit and sending to the device by the first electrical output port.

5. The USB active optical cable according to claim 1, when the second plug of the USB cable has not been connected to the device while the first plug is connected to the host:

the first input circuit continuously detects the first optical signal, the first electrical input port will present high impedance to ground of ZRX-HIGH-IMP-DC-POS; and once the second plug is connected to the device, the first input circuit receives the first optical signal, and the first control unit controls the first receiving unit to enter the transmission mode, while the first electrical input port is configured to the low-impedance receiver termination ($R_{RX-DC}$).

6. The USB active optical cable according to claim 5, when the first plug of the USB cable has not been connected to the host while the second plug is connected to the device, the second input circuit continuously detects the first optical signal, the second electrical input port will present high impedance to ground of ZRX-HIGH-IMP-DC-POS; and once the first plug is connected to the host, the second input circuit receives the first optical signal, and the second control unit controls the second receiving unit to enter the transmission mode, while the second electrical input port is configured to the low-impedance receiver termination ($R_{RX-DC}$).

7. The USB active optical cable according to claim 1, when the first plug or the second plug is connected to the host or the device respectively, each waits t4 time and then enters the initialization mode; and/or, for self-powered USB plugs when the first plug or the second plug-is powered on again after power off, each waits t4 time and then enters the initialization mode.

8. The USB active optical cable according to claim 1, wherein the first output circuit outputs the first optical signal, when the first electrical input port under the power saving mode, detects the AC signal, and the first transmitting unit enters the transmission mode from the power-saving mode; and the second input circuit under the power saving mode responds to the detection of the first optical signal, the second receiving unit enters the transmission mode from the power saving mode.

9. The USB active optical cable according to claim 1, wherein the second electrical output port-of the second plug-in the power saving mode performs the receiver termination detection at an interval of t2, if the receiver termination is detected as normal, the second control unit causes the second output circuit to emit the second optical signal; and the first input circuit-of the first plug under the power saving mode conducts polling at an interval of t3, and when the second optical signal is detected, the first plug remains in the power saving mode.

10. A USB plug adapted for connection to a host, comprising:

a first transmitting unit, a first receiving unit, and a first control unit;

wherein the first transmitting unit comprises a first electrical input port, a first transmitting high-speed transmission circuit and a first output circuit; and the first receiving unit comprises a first electrical output port, a first receiving high-speed transmission circuit, and a first input circuit; and the USB plug being connected to the host, the first transmitting unit and the first receiving unit are powered on and enter an initialization mode respectively; and under the initialization mode, the first input circuit of the first receiving unit continuously detects a first optical signal, the first electrical output port of the first receiving unit performs the receiver termination detection at an interval of t0; when a low-impedance receiver termination ($R_{RX-DC}$) is detected, the first control unit drives the first output circuit to output the first optical signal and controls the first transmitting unit to enter a transmission mode;

the operating mode of the USB plug further comprises a power saving mode;

wherein the first electrical output port of the USB plug in the power saving mode performs the receiver termination detection at an interval of t2, if the receiver termination is in low-impedance receiver termination, the first control unit drives the first output circuit to emit a second optical signal; and the first output circuit outputs the first optical signal, when the first electrical input port under the power saving mode, detects the AC signal, and the first transmitting unit enters the transmission mode from the power-saving mode; and while the first transmitting unit enters the transmission mode, the first receiving unit enters the transmission mode.

11. The USB plug according to claim 10, wherein the first receiving unit is under the initialization mode, when the first input circuit-receives the first optical signal and causes the first receiving unit to enter a transmission mode, the first control unit configures the first electrical input port to the low-impedance receiver termination ($R_{RX\text{-}DC}$).

12. The USB plug according to claim 10, wherein when the first transmitting unit is under the transmission mode, when the USB plug receives data transmitted from the host, the first output circuit of the first transmitting unit emits light and transmits the data to a second receiving unit of a second plug; and/or when the first receiving unit is under the transmission mode, the light transmitted from a second output circuit to the first receiving high-speed transmission circuit through the first input circuit; wherein the light processing in the first receiving high-speed transmission circuit and sending to a device by the first electrical output port.

13. A USB plug adapted for connection to a device, comprising:

a second transmitting unit, a second receiving unit, and a second control unit; wherein the second transmitting unit comprises a second electrical input port, a second transmitting high-speed transmission circuit and a second output circuit; and the second receiving unit comprises a second electrical output port, a second receiving high-speed transmission circuit and a second input circuit; and the USB plug being connected to the device, the second transmitting unit and the second receiving unit are powered on and enter an initialization mode respectively; and under the initialization mode, the second input circuit of the second receiving unit continuously detects whether a first optical signal is transmitted from another plug, while the second electrical output port-of the second receiving unit performs receiver termination detection at an interval of t0; when a low-impedance receiver termination ($R_{RX\text{-}DC}$) is detected, the second control unit drives the second output circuit-to output the first optical signal and controls the second transmitting unit-to enter a transmission mode;

the operating mode of the USB plug further comprises a power saving mode;

wherein the second input circuit of the USB plug in the power saving mode conducts polling at an interval of t3, and when the second optical signal is detected, the USB plug remains in the power saving mode; and the second receiving unit enters the transmission mode from the power saving mode to respond to the detection of the first optical signal by the second input circuit in the power saving mode; and while the second transmitting unit enters the transmission mode, the second receiving unit also enters the transmission mode.

14. The USB plug according to claim 13, wherein when the second receiving unit is under the initialization mode, when the second input circuit receives the first optical signal, the second receiving unit to enter the transmission mode, the second control unit configures the second electrical input port to the low-impedance receiver termination ($R_{RX\text{-}DC}$).

15. The USB plug according to claim 13, wherein when the second receiving unit is under the transmission mode, the light transmitted from the first output circuit to the second receiving high-speed transmission circuit through the second input circuit; wherein the light processing in the second receiving high-speed transmission circuit and sending to the device by the second electrical output port; and/or when the second transmitting unit is under the transmission mode, the USB plug receives the data transmitted form the device, the second output circuit of the second transmitting unit-emits light and transmits the data to another plug.

* * * * *